Patented July 3, 1945

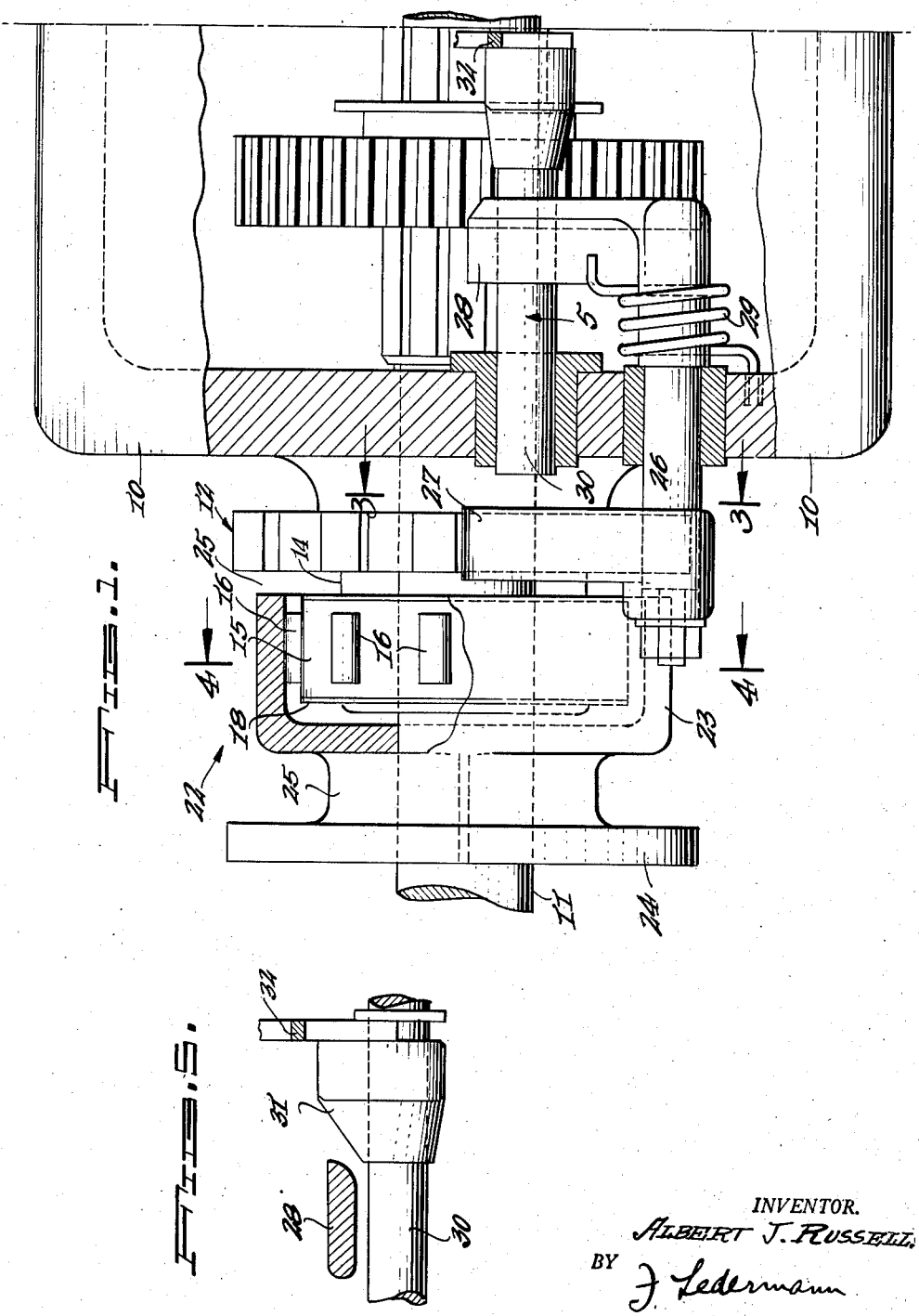

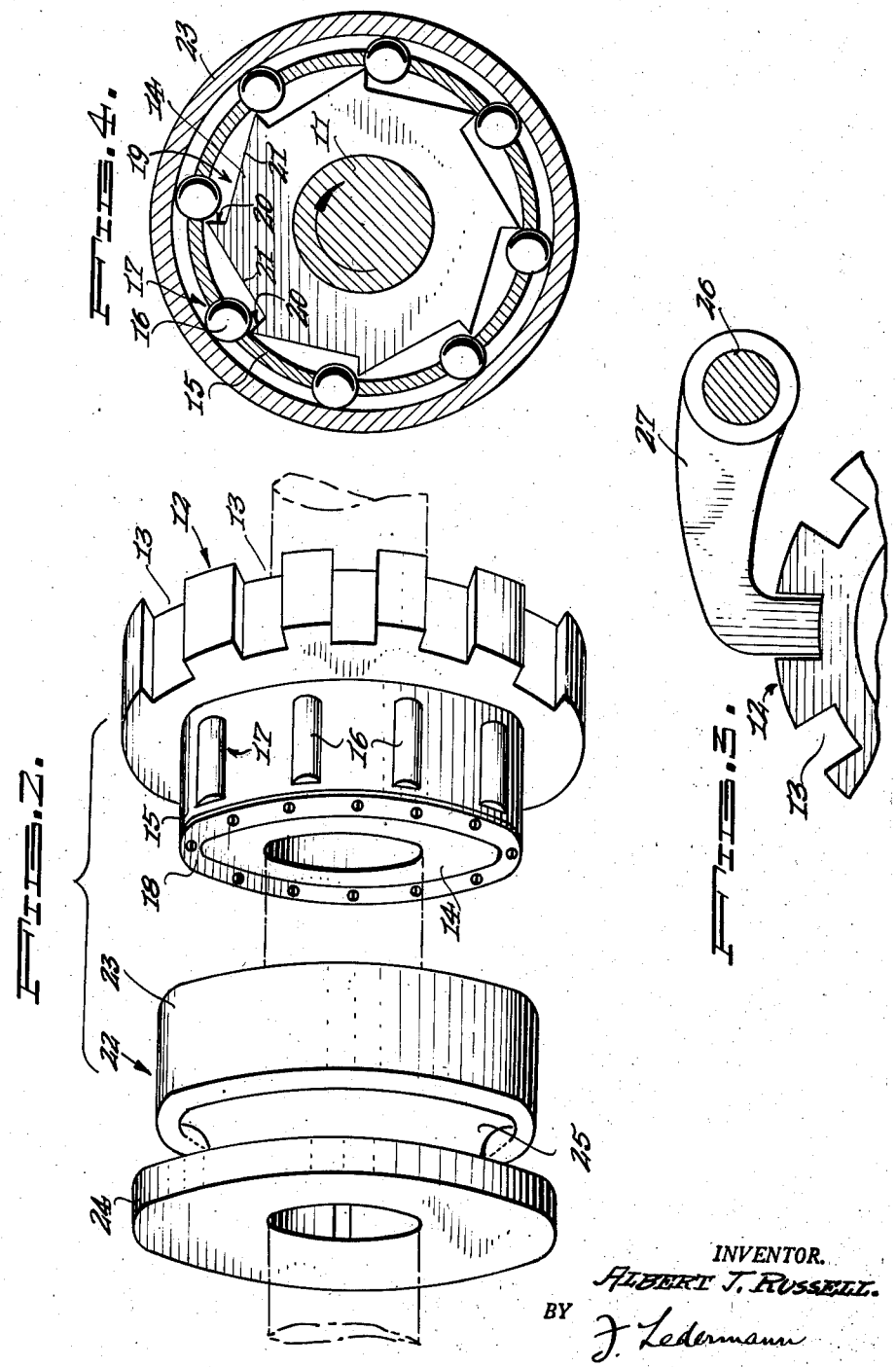

2,379,829

UNITED STATES PATENT OFFICE 2,379,829

DEVICE FOR AUTOMATICALLY PREVENTING MOTOR VEHICLES FROM ROLLING BACK ON GRADES

Albert J. Russell, New York, N. Y.

Application June 14, 1944, Serial No. 540,180

4 Claims. (Cl. 188—30)

This invention aims to provide means for motor vehicles whereby, when the car is facing up hill and at rest, and is about to be started forward, the car will be automatically restrained from rolling backward, so that it may be safely started forward up the hill with the elimination of the common danger of first descending a distance before it can be started forward. The nuisance mentioned is a very common one and causes a considerable amount of annoyance to drivers, as a special skill is generally necessary for the driver to avoid the down roll of the car prior to getting it under way.

Another object of this invention is the provision of the means above mentioned in conjunction with means for deactivising the first-named means automatically upon shifting of the gear shift lever into reverse position in order to enable the car to be backed up, and conversely automatically reactivising the first-named means upon disengagement of the shift lever from the reverse position.

The above and other objects will become apparent in the description below, wherein characters of reference refer to like-numbered parts in the accompanying drawings. It is to be noted that the drawings are intended for the purpose of illustration only, and it is neither intended nor desired to limit the invention necessarily to the exact details shown excepting insofar as they may be deemed essential to the invention.

Referring briefly to the drawings,

Fig. 1 is a fragmentary plan view, partly in section, of the transmission of a motor vehicle, showing the invention applied thereto.

Fig. 2 is a perspective view of the members of the device, with one member separated from the others.

Fig. 3 is a sectional view taken on the line 3—3 of Fig. 1.

Fig. 4 is a sectional view taken on the line 4—4 of Fig. 1.

Fig. 5 is a sectional view taken on the line 5—5 of Fig. 1.

Referring in detail to the drawings, the numeral 10 indicates the transmission case or housing of a motor vehicle and 11 the transmission or drive shaft extending rearward (toward the left Fig. 1) toward the differential, not shown. Loosely mounted on the shaft 11 is a toothed wheel 12 having slots 13 between the teeth thereof. Integral with and extending rearward from the wheel 12 is a flange or drum 14. Loosely mounted on the drum 14 is a ring 15 having a plurality of spaced rollers 16 mounted therein, in slots 17 which pass through the ring, in such manner that the rollers although confined laterally within the slots are free to move a short distance radially with respect to the drum 14. The ring 15 and its rollers 16 are built in accordance with standard free wheeling principles. The ring 15 is confined on the drum 14 by means of an annular washer 18 screwed or bolted against the side of the drum.

The peripheral surface of the drum 14 is gouged out or otherwise formed to provide a series of identical zig-zag like peripheral cam surfaces 19 which, with the radial wall 20 at one end of each surface or floor 21 of the cams 19, constitute a series of pockets arranged around the periphery. The floor 21 of each cam 19 rises from the base of its wall 20 to the peak of the wall 20 of the next adjacent pocket. Thus, each pocket has a depth which is at the maximum at one end, at the wall 20, and which gradually lessens to zero at the other end, at the next wall 20.

The member 22 comprises a body 25 having a flange 23 extending forward therefrom and a collar or flange 24 on the rear end thereof, and this member is keyed to the shaft 11 with the flange 23 registering around the ring 15 and rollers 16, as shown in Fig. 1. When thus assembled, the rollers 16 are in light contact with the inner surface of the flange 23.

A stub shaft 26 is pivotally mounted in the housing 10 and one end thereof is provided with a toothed arm or hook 27 adapted to register in one of the slots 13 of the wheel 12. Inside the housing 10 the shaft 26 has a bent arm 28. A coiled spring 29 having one end anchored in the housing 10 and the other extending over the top of the arm 28, normally urges the hook 27 into engagement with the wheel 12. A rod 30 is slidably mounted in the housing 10, and the arm 28 rests thereagainst. An upwardly sloping ramp or cam 31 is rigid on the arm 30 near the forward end thereof, and when the rod is moved rearward the cam 31 forces the arm 28 upward and thereby disengages the hook 27 from the wheel 12 and permits the latter to rotate on the shaft 11. Either the fork of the gear shift lever or an extension thereof, shown at 32, partly encircles the shaft 30 while the lever is being shifted into reverse gear so as to simultaneously shift the rod 30 rearward, and when the lever is moved out of reverse gear the rod 30 will be withdrawn to its inactive position, thus permitting the spring 29 to push the hook 27 into engagement with the wheel 12.

As the hook 27 normally registers in a slot 13, the wheel 12 is prevented from rotating with the shaft 11. During forward movement of the vehicle, the shaft 11 rotates in a counter-clockwise direction (Fig. 4), whence the ring 15 automatically positions itself with the rollers 16 against the deep ends of the pockets 19, and the ring flange 23 freely rotates in the same direction in practically frictionless contact with the rollers through the medium of a film of oil. As soon as the shaft 11 begins to turn in the direction of the arrow, as, for instance, when the vehicle is facing uphill and the clutch is disengaged preparatory to starting forward, the engagement of the rollers 16 with the inner surface of the flange 23 is sufficient for the latter to move the rollers (and the ring 15) also in the same direction, and in doing so the rollers instantly lock with the flange 23 and thereby lock the shaft 11 against rotation, so that the vehicle is thus prevented from rolling backward down hill.

When it is desired to back up the car, however, shifting the gear lever 32 into reverse gear, as above set forth, disengages the hook 27 from the wheel 12 so that the latter is then free to rotate and hence does not obstruct rotation of the shaft 11 in the reverse direction.

In practice, the rollers 16 are of course well coated with oil, and a heavy oil. The entire device including the members 12—4 and 22 may be mounted otherwise or elsewhere than illustrated and described, for instance, entirely within the transmission housing 10, in which case the entire device would be well bathed in the transmission oil.

The same functioning could be achieved with other means. For instance, if the drum 14 were made integral with the wheel 12 and keyed to the shaft 11, and the member 22 were loosely positioned on the shaft 11 with the flange 23 encircling the ring 15, the device would function on the principle of centrifugal force acting upon the rollers 16. Or pawls could be substituted for the rollers in the latter construction.

Obviously, modifications in form and structure may be made without departing from the spirit and scope of the invention.

I claim:

1. In combination with the transmission shaft of a motor vehicle, a toothed wheel loosely mounted on said shaft, a drum integral with said wheel, a cylindrical member keyed on said shaft and having a flange surrounding said drum, means partly on said drum and partly between said drum and said member for interlocking said drum and said member upon rotation of said shaft in one direction and for disengaging said interlocking upon rotation of said shaft in the reverse direction, and releasable means normally locking said toothed wheel against rotation.

2. The device set forth in claim 1, said releasable means comprising a hook having means normally urging the same against said toothed wheel, and means for disengaging said hook from said toothed wheel.

3. The device set forth in claim 1, said releasable means comprising a rod rotatably mounted parallel with said shaft, said rod having a hook thereon adjacent said wheel, resilient means normally urging said hook into engagement with said wheel, and means for rotating said rod to lift said hook out of engagement with said wheel.

4. The device set forth in claim 1, said releasable means comprising a stub shaft mounted parallel with said first shaft, said stub shaft having a hook thereon and having means for normally urging rotation thereof in a direction to engage said hook with said wheel, said stub shaft having an arm thereon, a rod slidably mounted parallel with said stub shaft and having said last-named means normally urging said arm thereagainst, said rod having a cam thereon for raising said arm upon sliding of said rod to lift said hook out of engagement with said wheel.

ALBERT J. RUSSELL.